US005414999A

United States Patent [19]

Barnes

[11] Patent Number: 5,414,999

[45] Date of Patent: May 16, 1995

[54] INTEGRAL AFT FRAME MOUNT FOR A GAS TURBINE COMBUSTOR TRANSITION PIECE

[75] Inventor: John E. Barnes, Schenectady, N.Y.

[73] Assignee: General Electric Co., Schenectady, N.Y.

[21] Appl. No.: 147,295

[22] Filed: Nov. 5, 1993

[51] Int. Cl.[6] .......... F02C 1/00

[52] U.S. Cl. .......... 60/722

[58] Field of Search .......... 60/39.31, 39.32, 39.37, 60/722, 747, 752, 39.75, 39.464; 415/182.1

[56] References Cited

U.S. PATENT DOCUMENTS

| | | | |
|---|---|---|---|
| 2,547,619 | 4/1951 | Buckland | 60/39.32 |
| 2,594,808 | 4/1952 | Rubbra | 60/39.37 |
| 2,608,057 | 8/1952 | Boyd et al. | 60/39.37 |
| 3,609,968 | 10/1972 | Mierley, Sr. et al. | 60/39.32 |
| 3,657,882 | 4/1972 | Hugoson | 60/39.31 |
| 3,759,038 | 9/1973 | Scalzo et al. | 60/39.32 |
| 4,191,011 | 3/1980 | Sweeny et al. | 60/39.32 |
| 4,195,474 | 4/1980 | Bintz et al. | 60/39.37 |
| 4,232,527 | 11/1980 | Reider | 60/754 |
| 4,297,843 | 11/1981 | Sato et al. | 60/39.37 |
| 4,422,288 | 12/1983 | Steber | 60/39.37 |
| 5,190,245 | 3/1993 | Debeneix | 60/39.31 |
| 5,265,412 | 11/1993 | Bagepalli | 60/39.32 |

*Primary Examiner*—Timothy S. Thorpe

*Attorney, Agent, or Firm*—Nixon & Vanderhye

[57] ABSTRACT

A transition piece (110) for a gas turbine comprising a tubular body having an upstream end (112) and a downstream end (114), the downstream end (114) formed with an integral frame (116) surrounding an opening at the downstream end; and an aft mount connector 126) adapted to connect the transition piece (110) to a first stage nozzle of the gas turbine, the aft mount connector (126) formed integrally with the frame (116).

6 Claims, 3 Drawing Sheets

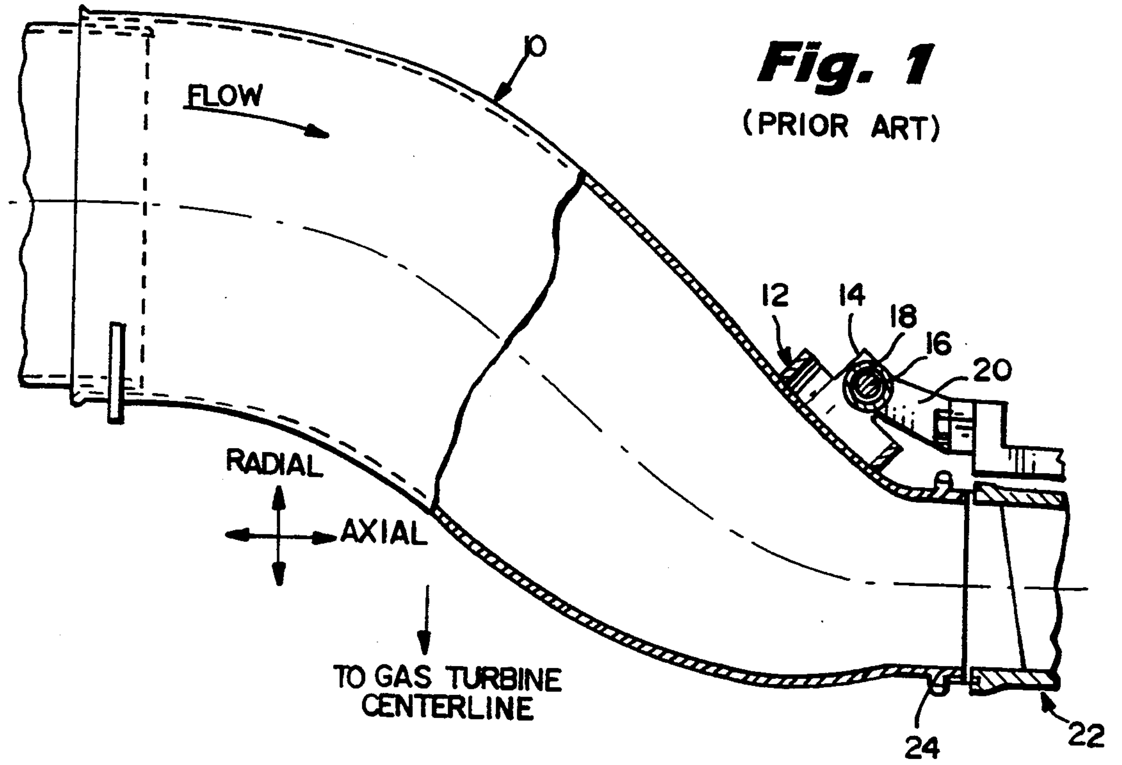
Fig. 1
(PRIOR ART)
Fig. 2
(PRIOR ART)
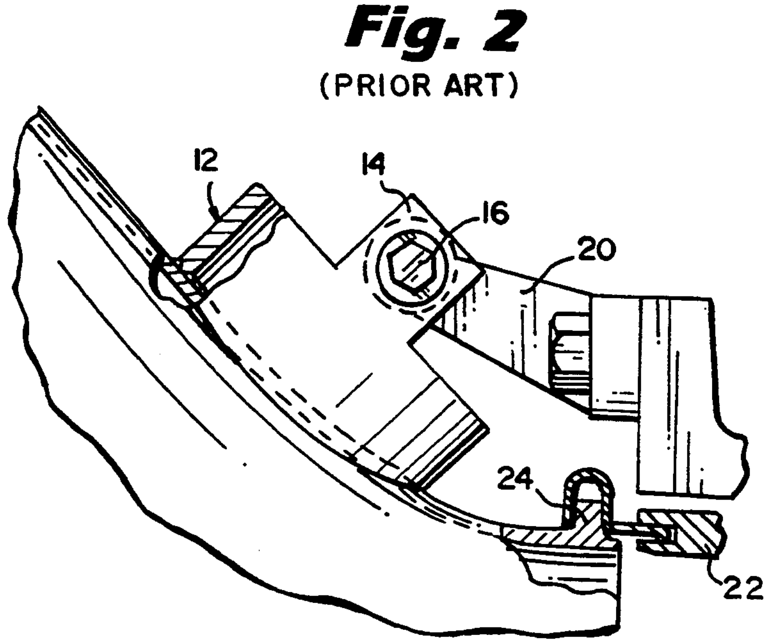

INTEGRAL AFT FRAME MOUNT FOR A GAS TURBINE COMBUSTOR TRANSITION PIECE

TECHNICAL FIELD

This invention relates generally to gas turbine structural support systems with high thermal gradients combined with high mechanical loads which produce potentially unacceptably high stress levels. In particular, the invention deals with the aft mounting system for the transition piece or duct of a gas turbine.

BACKGROUND AND SUMMARY OF THE INVENTION

The transition piece in a gas turbine is a tubular member which connects a combustor of the combustion system of the gas turbine to the first stage of the turbine. In conventional constructions, an aft mount of the transition piece or duct is welded to and protrudes from the transition piece body upstream of the aft frame as shown in FIGS. 1 and 2 of the drawings. The aft mount on the transition piece 10 in this prior construction comprises a tubular projection 12 with two diametrically opposed support lugs (one shown at 14) provided with aligned holes for receiving a bolt 16. This bolt will extend through a sleeve portion 18 of a bracket 20 secured to the first turbine stage, indicated at 22. The projection 12 is welded to the transition piece 10 upstream of an enlarged frame portion 24 of the transition piece which is designed to engage the first stage nozzle contact 22. The aft mount welded juncture to the transition piece body 10 is at a relatively thin metal area of the body to permit high heat flux through the metal from the high temperature internal combustion gas flow. This thin, high temperature metal is very flexible and thus has minimal thermal stress and fatigue cracking. However, vibratory motion of the combustion system is sufficiently large to cause significant wear at interfaces. In addition, the mounting arrangement is expensive to manufacture.

Other prior aft mount designs consist of thin plate buttresses welded to the transition piece body and extended to the support point. These plates are in an axial-radial plane and attached at a similar location as the aft mount tubular projection described above. This particular design has been plagued with fatigue cracking.

The present invention provides a significantly stiffer aft mount for the transition piece, thereby reducing vibratory motion of the combustion system. Simultaneously, by attaching the aft mount section of integral design to the lower temperature extremity of the aft frame, and using an optimal geometric contour into the frame, thermal stress is maintained within allowable limits. The integral aft frame/mount in accordance with this invention can be cast as one piece in order to reduce parts, assembly time and welding which, in turn, reduces costs.

In the exemplary embodiment, the present invention includes a mount which is integral with the structural frame at the aft end of the transition piece. Specifically, the aft mount section is filletted into a center rib of the aft frame. At the same time, the aft mount curves 90° upwardly and rearwardly, i.e., in an upstream direction, terminating in a transversely oriented attachment tube adapted to receive a mounting bolt.

In its broadest aspect, the invention relates to a transition piece for a gas turbine comprising a tubular body having a downstream end including a frame surrounding an exit opening in the tubular body, and an aft mount connector integrally formed with the frame.

In another aspect, the present invention comprises a transition piece for a gas turbine comprising a tubular body having an upstream end and a downstream end, the downstream end formed with an integral frame surrounding an opening at the downstream end; and an aft mount connector adapted to connect the transition piece to a first stage nozzle of the gas turbine, the aft mount connector formed integrally with the frame.

In summary, the present invention has two advantages. First, the rigidity of the transition piece structural support is greatly increased thereby reducing vibratory motion and interface wear. Second, the cost of the transition piece assembly is substantially reduced due to the elimination of the separate aft mount. In addition, it will be appreciated that this integral aft frame/mount can be retrofit to existing gas turbines.

Other objects and advantages of the invention will become apparent from the detailed description which follows.

BRIEF DESCRIPTION OF THE DRAWINGS

FIG. 1 is a side elevation view of a combustion transition piece or duct having a conventional aft supporting mount structure;

FIG. 2 is an enlarged part sectional detail from FIG. 1;

BEST MODE FOR CARRYING OUT THE INVENTION

Figure 3:
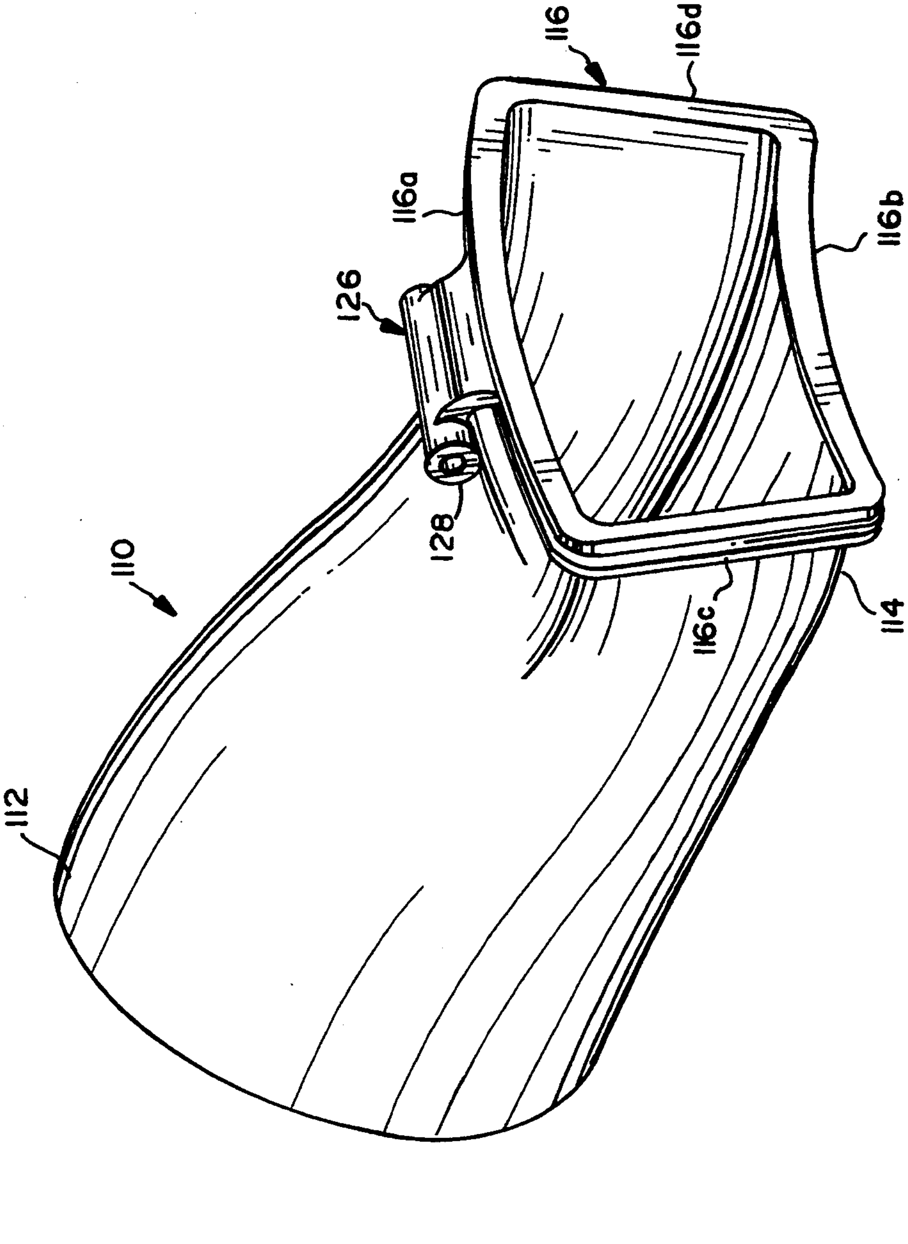
FIG. 3 is a perspective view of a transition piece in accordance with this invention, and incorporating an integral aft frame/mount.
Figure 4:
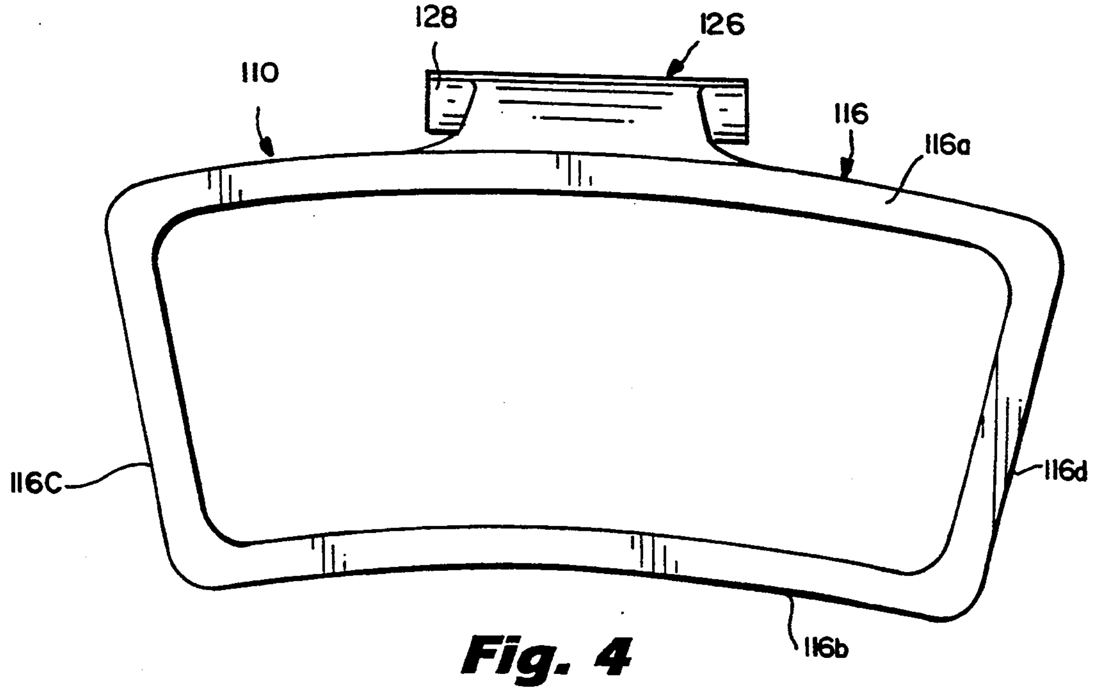
FIG. 4 is a partial front view of the integral aft frame/mount illustrated in FIG. 3.
Figure 5:
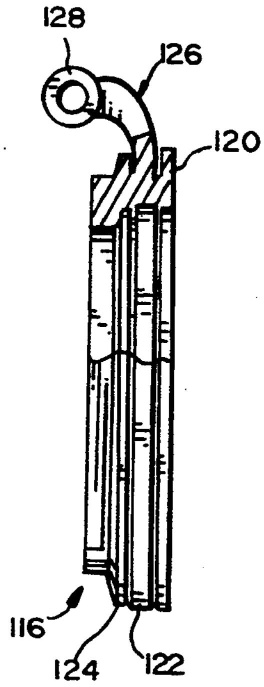
FIG. 5 is a partial side view, partly in section, illustrating the transition piece frame with integral mount in accordance with this invention.

With reference now to FIGS. 3 and 4, the transition piece 110 in accordance with this invention includes an upstream end 112 for connection to a combustor and a downstream or forward end 114 which connects to the first stage of a gas turbine. The transition piece 110 includes an enlarged integral frame portion 116 at its forward end, surrounding the rectangular flow opening therein, and including an upper (or radially outer—relative to a gas turbine center line) edge **116*a*, a lower (or radially inner) edge 116*b* and a pair of side edges 116*c* and 116*d*. This frame portion includes a series of three annular ribs including a forward rib 120, a center rib 122 and a rearward rib 124, best seen in FIG. 5. The aft mount connector device 126 in accordance with this invention is filletted integrally into the center rib 122 at about the center portion of the upper edge 116*a* of the aft frame 116. The aft mount connector 126 extends radially upwardly from the frame and then curves 90° in an upstream or rearward direction where it merges with a transversely oriented attachment tube or sleeve 128 adapted to receive an appropriate mounting bolt (similar to bolt 16 in FIGS. 1 and 2**) for securing the transition piece to a nozzle retaining ring (not shown). The transition piece otherwise assumes the same orientation vis-a-vis the gas turbine generally, as described above in connection with the conventional transition piece.

By integrating the aft mount connector 126 of the gas turbine transition piece 110 with the transition piece aft frame 116, the rigidity of the transition piece 110 structural support is greatly increased, and thereby reduces vibratory motion and consequent interface wear. Simultaneously, by attaching the aft mount connector 126 to the downstream extremity (the low temperature extremity) of the transition piece 110, and using an optimal geometric contour into the frame, resulting thermal stresses are maintained within allowable limits. The transition piece 110 is preferably cast as one component part, which reduces parts, assembly time and welding which, in turn, saves considerable costs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transition piece for connection between a gas turbine combustor and a stage of the gas turbine, the transition piece comprising a tubular body having an upstream end for connection to the gas turbine combustor and a downstream end for connection to the turbine stage, wherein the downstream end is formed with an integral frame including a plurality of axially spaced ribs substantially entirely surrounding a generally rectangular flow opening, and further wherein a first portion of an integral aft mount connector for securing said downstream end to the turbine stage extends radially away from one of said plurality of ribs, relative to a centerline of the gas turbine.

2. A transition piece in accordance with claim 1 wherein said first portion also extends axially toward said upstream end.

3. A transition piece in accordance with claim 2 wherein said aft mount connector includes a second portion extending transversely of said first portion.

4. A transition piece according to claim 1 wherein said plurality of ribs includes three axially spaced, peripheral ribs and wherein said aft mount connector is integral with an intermediate one of said three ribs.

5. A transition piece according to claim 1 wherein said tubular body, said frame and said aft mount connector are cast as a single piece.

6. A transition piece in accordance with claim 3 wherein said second portion comprises a tubular sleeve.

* * * * *